US012760660B1

(12) United States Patent
Kray et al.

(10) Patent No.: US 12,760,660 B1
(45) Date of Patent: Oct. 13, 2026

(54) GAS TURBINE ENGINE AND CASING ASSEMBLY THEREFOR

(71) Applicant: General Electric Company, Evendale, OH (US)

(72) Inventors: Nicholas Joseph Kray, Mason, OH (US); Michał Pabich, Warsaw (PL); Wei Wu, Mason, OH (US); Ming Xie, Dayton, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/272,098

(22) Filed: Jul. 17, 2025

(30) Foreign Application Priority Data

Jun. 3, 2025 (PL) ........................................ 452234

(51) Int. Cl.

| | |
|---|---|
| ***F01D 21/04*** | (2006.01) |
| ***F01D 11/12*** | (2006.01) |
| ***F01D 25/24*** | (2006.01) |

(52) U.S. Cl.

CPC .......... *F01D 21/045* (2013.01); *F01D 11/122* (2013.01); *F01D 25/243* (2013.01); *F05D 2220/36* (2013.01); *F05D 2240/14* (2013.01); *F05D 2300/603* (2013.01)

(58) Field of Classification Search

CPC .... F01D 21/045; F01D 11/122; F01D 25/243; F05D 2220/36; F05D 2240/14; F05D 2300/603

See application file for complete search history.

(56) References Cited

U.S. PATENT DOCUMENTS

| | | | | |
|---|---|---|---|---|
| 4,484,856 A * | 11/1984 | Patacca | F02C 7/05 181/204 |
| 4,503,104 A | 3/1985 | Belanger | |
| 4,534,698 A * | 8/1985 | Tomich | F01D 21/045 415/121.2 |
| 5,516,257 A * | 5/1996 | Kasprow | F01D 21/045 415/200 |
| 6,179,551 B1 * | 1/2001 | Sathianathan | F01D 21/045 415/197 |
| 6,371,721 B1 * | 4/2002 | Sathianathan | F01D 21/045 415/200 |
| 6,394,746 B1 | 5/2002 | Sathianathan | |

(Continued)

FOREIGN PATENT DOCUMENTS

| | | | | |
|---|---|---|---|---|
| FR | 2875850 A1 * | 3/2006 | F01D 21/045 |
| FR | 3121480 A1 | 10/2022 | |
| WO | 2025061701 A1 | 3/2025 | |

*Primary Examiner* — Eldon T Brockman

(74) *Attorney, Agent, or Firm* — McGarry Bair PC

(57) ABSTRACT

A gas turbine engine, comprising a fan section, compressor section, combustor section, and turbine section in serial flow arrangement, at least one of the fan section, the compressor section, or the turbine section comprising: a rotor comprising a plurality of blades and rotatable about a rotational axis; and a casing assembly disposed at least partially around the rotor, the casing assembly comprising: a forward casing section; an aft casing section; an outer ring coupled to the forward casing section and the aft casing section, the outer ring coupled to the forward casing section at a joint; and an inner containment ring radially inward of the outer ring, and at least partially axially aligned with the plurality of blades.

20 Claims, 4 Drawing Sheets

(56) References Cited

U.S. PATENT DOCUMENTS

| | | | | |
|---|---|---|---|---|
| 6,619,913 | B2 * | 9/2003 | Czachor | F01D 21/045 415/173.1 |
| 6,652,222 | B1 * | 11/2003 | Wojtyczka | B32B 5/18 415/200 |
| 6,814,541 | B2 * | 11/2004 | Evans | B29C 33/40 415/200 |
| 7,753,312 | B2 | 7/2010 | Schmidt | |
| 7,972,109 | B2 * | 7/2011 | Crall | F04D 29/522 415/173.1 |
| 8,333,558 | B2 * | 12/2012 | Finn | F01D 21/045 415/173.1 |
| 8,403,624 | B2 | 3/2013 | Xie | |
| 8,858,156 | B2 | 10/2014 | Swenson | |
| 8,876,467 | B2 * | 11/2014 | Riou | B64D 33/02 415/214.1 |
| 10,907,651 | B2 * | 2/2021 | Crutchfield | F04D 29/023 |
| 11,015,482 | B2 | 5/2021 | Kasal | |
| 11,118,511 | B2 | 9/2021 | Finlayson | |
| 11,236,765 | B2 | 2/2022 | Kling | |
| 11,530,622 | B2 * | 12/2022 | Lefebvre | F04D 29/522 |
| 2005/0271503 | A1 * | 12/2005 | Harper | F01D 21/045 415/214.1 |
| 2014/0064938 | A1 * | 3/2014 | Eriksen | F01D 21/045 415/173.3 |
| 2014/0271148 | A1 * | 9/2014 | Dimelow | F04D 29/526 415/173.4 |
| 2016/0341070 | A1 | 11/2016 | Garcia | |
| 2020/0308986 | A1 | 10/2020 | Slayter | |

* cited by examiner

GAS TURBINE ENGINE AND CASING ASSEMBLY THEREFOR

CROSS REFERENCE TO RELATED APPLICATION

The present application claims the benefit of Polish Patent Application No. P.452234, filed on Jun. 3, 2025, which is hereby incorporated by reference herein in its entirety.

TECHNICAL FIELD

The present subject matter relates generally to a gas turbine engine having a casing assembly.

BACKGROUND

Turbine engines are driven by a flow of combustion gases passing through the engine to rotate a multitude of turbine blades, which, in turn, rotate compressor blades to provide compressed air to the combustor for combustion. A combustor can be provided within the turbine engine and is fluidly coupled with a turbine into which the combusted gases flow. Turbine engines can include fan sections comprising fan blades. The turbine blades, compressor blades, and the fan blades can rotate at high speeds.

DETAILED DESCRIPTION

Figure 1:
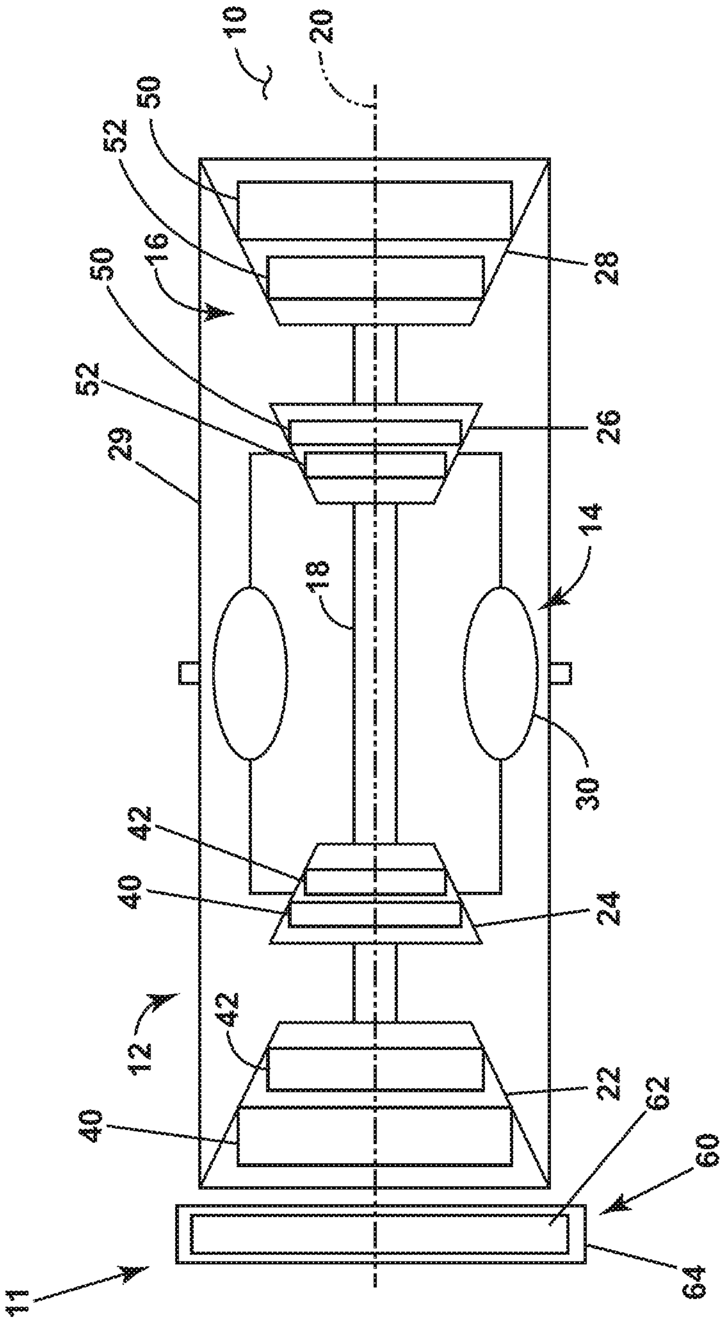
FIG. 1 is a schematic view of a gas turbine engine having a compression section, a combustion section, and a turbine section in accordance with various aspects described herein.

Aspects of the disclosure described herein are directed to a gas turbine engine and a casing assembly therefor. With some aspects, the disclosed casing assemblies include an outer ring and an inner containment ring. The inner containment ring can be located above (e.g., radially outward of) a rotating blade and can be provided to absorb energy, contain fragments, or both, during a blade release. The inner containment ring can include additional features and aids for containment of released blade fragments. The inner containment ring can comprise a composite ring, which can comprise one or more fiber reinforced composites, which can be formed by one or more of a variety of methods, such as automatic fiber placement (AFP), resin transfer molding (RTM), or hand layup. Materials of the composite can be woven, braided, unidirectional laminate, or combinations thereof. The inner containment ring can allow for the outer structural casing, including the outer ring, to be of a different material. For example, the outer structural casing can be tailored for structural loads and to maintain the load path during and after a fan blade release event. The inner containment ring can be coupled to the outer ring but can be provided such that the inner containment ring is not in the load path and does not carry structural loads (e.g., multi-axial structural loads).

Many other possible aspects and configurations in addition to those shown in the included figures are contemplated by the present disclosure.

For purposes of illustration, the present disclosure will be described with respect to a turbine engine. It will be understood, however, that aspects of the disclosure described herein are not so limited. A casing assembly as described herein can be implemented in various engines, including but not limited to turbojet, turboprop, turboshaft, and turbofan engines. Aspects of the disclosure discussed herein may have general applicability within non-aircraft engines having a casing, such as other mobile applications and non-mobile industrial, commercial, and residential applications.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The terms like "first", "second", etc. may be used interchangeably to distinguish one component from another and are not intended to signify location or importance of the individual components.

The terms "forward" and "aft" refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" may be a gas or a liquid. The term "fluidly coupled" means that a fluid is capable of making the connection between the areas specified.

Additionally, as used herein, the terms "radial" or "radially" refer to a direction away from a common center. For example, in the overall context of a turbine engine, radial refers to a direction along a ray extending between a center longitudinal axis or centerline of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only, and the dimensions, positions, order, and relative sizes reflected in the drawings attached hereto can vary.

The singular forms "a" "an", and "the" include plural references unless the context clearly dictates otherwise.

Furthermore, as used herein, the term "set" or a "set" of elements can be any number of elements, including only one.

Uses of "and" and "or" are to be construed broadly. For example, and without limitation, uses of "and" do not necessarily require all elements or features listed, and uses of "or" are inclusive unless such a construction would be illogical.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and systems. In at least some instances, the approximating language may correspond to the precision of an instrument for measuring the value, or the precision of the methods or machines for constructing or manufacturing the components and systems. For example, the approximating language may refer to being within a 1, 2, 4, 5, 10, 15, or 20 percent margin in either individual values, range(s) of values and endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

"Proximate" as used herein is a descriptor for locating parts described herein. Further, the term "proximate" means nearer or closer to the part recited than the following part. For example, a first aperture proximate a wall, the first aperture located upstream from a second aperture means that the first aperture is closer to the wall than the first aperture is to the second aperture.

The term "composite," as used herein is, is indicative of a component having two or more materials. A composite can be a combination of at least two metallic or non-metallic elements or materials; or a combination of metallic and non-metallic elements or materials. Examples of a composite material can be, but are not limited to, a polymer matrix composite (PMC), a ceramic matrix composite (CMC), a metal matrix composite (MMC), carbon fibers, a polymeric resin, a thermoplastic resin, bismaleimide (BMI) materials, polyimide materials, an epoxy resin, glass fibers, and silicon matrix materials.

As used herein, a "composite" component refers to a structure or a component including any suitable composite material. Composite components, such as a composite containment ring, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of a material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

The term "metallic" as used herein is indicative of a material that includes metal such as, but not limited to, titanium, iron, aluminum, stainless steel, and nickel alloys. A metallic material or alloy can be a combination of at least two or more elements or materials, where at least one is a metal.

FIG. 1 is a schematic view of a gas turbine engine 10. As a non-limiting example, the gas turbine engine 10 can be used within an aircraft. The gas turbine engine 10 can include, at least, a fan section 11, a compressor section 12, a combustion section 14, and a turbine section 16 in a serial flow arrangement. A drive shaft 18 rotationally couples the compressor section 12 and turbine section 16, such that rotation of one affects the rotation of the other and defines a rotational axis or engine centerline 20 for the gas turbine engine 10. The fan section 11 can be coupled to the drive shaft 18.

The compressor section 12 can include a low-pressure (LP) compressor 22, and a high-pressure (HP) compressor 24 serially fluidly coupled to one another. The turbine section 16 can include an HP turbine 26, and an LP turbine 28 serially fluidly coupled to one another. The drive shaft 18 can operatively couple the LP compressor 22, the HP compressor 24, the HP turbine 26 and the LP turbine 28 together. Alternatively, the drive shaft 18 can include a plurality of shafts, such as an LP drive shaft and an HP drive shaft. The LP drive shaft can couple the LP compressor 22 to the LP turbine 28, and the HP drive shaft can couple the HP compressor 24 to the HP turbine 26. An LP spool can be defined as the combination of the LP compressor 22, the LP turbine 28, and the LP drive shaft such that the rotation of the LP turbine 28 can apply a driving force to the LP drive shaft, which in turn can rotate the LP compressor 22. An HP spool can be defined as the combination of the HP compressor 24, the HP turbine 26, and the HP drive shaft such that the rotation of the HP turbine 26 can apply a driving force to the HP drive shaft which in turn can rotate the HP compressor 24.

The compressor section 12 can include a plurality of axially spaced stages. Each stage includes a set of compressor blades 40 (e.g., circumferentially-spaced rotating blades) and a set of compressor vanes 42 (e.g., circumferentially-spaced stationary vanes). The compressor blades 40 for a stage of the compressor section 12 can be mounted to a disk, which is mounted to the drive shaft 18. Each set of compressor blades 40 for a given stage can have its own disk. The compressor vanes 42 of the compressor section 12 can be mounted to a shroud or casing 29, which can extend circumferentially about and enshroud one or more sections of the gas turbine engine 10. The representation of the compressor section 12 is merely schematic and there can be any number of compressor blades 40, compressor vanes 42, and compressor stages. Further, there can be any number of other components within the compressor section 12.

Similar to the compressor section 12, the turbine section 16 can include a plurality of axially spaced stages, with each stage having a set of turbine blades 50 (e.g., circumferentially-spaced, rotating blades) and a set of turbine vanes 52 (e.g., circumferentially-spaced stationary vanes). The turbine blades 50 for a stage of the turbine section 16 can be mounted to a disk which is mounted to the drive shaft 18. Each set of turbine blades 50 for a given stage can have its own disk. The turbine vanes 52 of the turbine section 16 can be mounted to the shroud or casing 29 in a circumferential manner. The representation of the turbine section 16 is merely schematic and there can be any number of turbine blades 50, turbine vanes 52, and turbine stages. Further, there can be any number of other components within the turbine section 16.

The combustion section 14 can be provided serially between the compressor section 12 and the turbine section 16. The combustion section 14 can be fluidly coupled to at least a portion of the compressor section 12 and the turbine section 16 such that the combustion section 14 at least partially fluidly couples the compressor section 12 to the turbine section 16. As a non-limiting example, the combustion section 14 can be fluidly coupled to the HP compressor 24 at an upstream end of the combustion section 14 and to the HP turbine 26 at a downstream end of the combustion section 14. The combustion section 14 can include a combustor 30. In a non-limiting example, the combustor 30 can have a combination arrangement located with the shroud or casing 29 of the gas turbine engine 10. The shroud or casing 29 can enshroud or cover at least a portion of the combustion section 14.

The fan section 11 can include a fan 60 having a plurality of circumferentially spaced fan blades 62. A fan casing 64 can enshroud or cover at least a portion of the fan section 11. The fan casing 64 can be separate from or at least partially integrated with the casing 29.

During operation of the gas turbine engine 10, ambient or atmospheric air is drawn into the compressor section 12 via the fan 60, where the air is compressed defining a pressurized air. The pressurized air can then flow into the combustion section 14 where the pressurized air is mixed with fuel and ignited, thereby generating combustion gases. Some work can be extracted from these combustion gases by the HP turbine 26, which drives the HP compressor 24. The combustion gases are discharged into the LP turbine 28, which can extract additional work to drive the LP compressor 22, and the exhaust gas is ultimately discharged from the gas turbine engine 10 via an exhaust section (not illustrated) downstream of the turbine section 16. The driving of the LP turbine 28 drives the LP spool to rotate the fan 60 and the LP compressor 22. The pressurized airflow and the combustion gases can together define a working airflow that flows through the fan, compressor section 12, combustion section 14, and turbine section 16 of the gas turbine engine 10.

Figure 2:
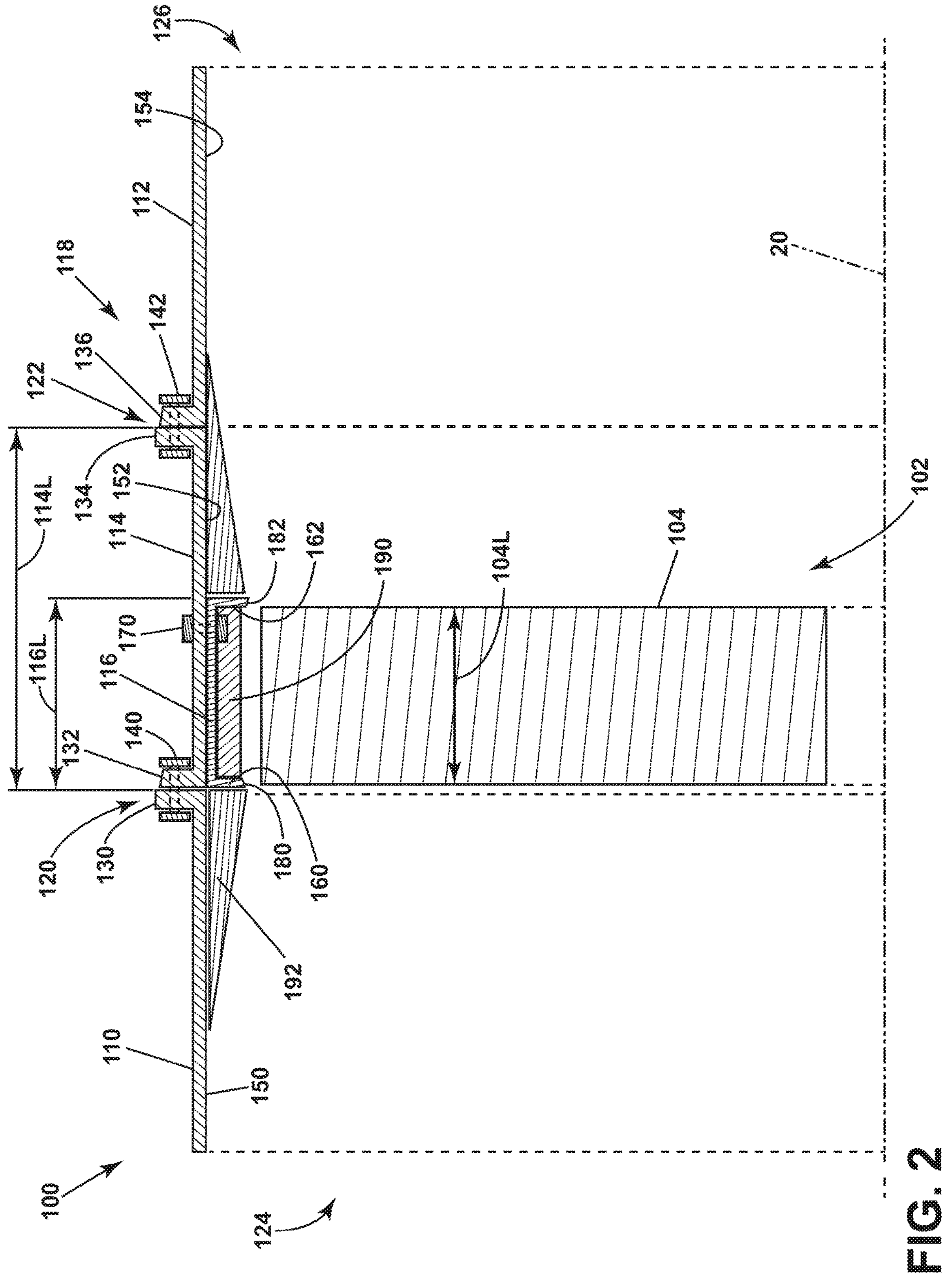
FIG. 2 is a cross-sectional view of a casing assembly in accordance with various aspects described herein.

FIG. 2 depicts a casing assembly 100 enshrouding a rotor 102 having a set of blades 104. The casing assembly 100 can be utilized with the gas turbine engine 10 illustrated in FIG. 1 to at least partially enshroud blades thereof, such as the compressor blades 40 of the compressor section 12, the turbine blades 50 of the turbine section 16, the fan blades 62 of the fan section 11, or combinations thereof. For example, the casing assembly 100 can be utilized as the fan casing 64 (FIG. 1), the casing 29 (FIG. 1), or portions and combinations thereof. In some instances, the casing assembly 100 can be provided as a mid-fan casing (MFC), the rotor 102 can be a rotor of the LP compressor 22 (FIG. 1), and the set of blades 104 can include compressor blades 40 (FIG. 1) of the LP compressor 22 (FIG. 1).

The casing assembly 100 can include a forward casing section 110, an aft casing section 112, an outer ring 114, and an inner containment ring 116, each of which can include an annular configuration about the engine centerline 20. For example, the outer ring 114 can be axially between the forward casing section 110 and the aft casing section 112, relative to the engine centerline 20. The forward casing section 110, the aft casing section 112, and the outer ring 114 can be coupled together to provide a structural casing 118 (e.g., an outer structural casing). For example, the outer ring 114 can be coupled to the forward casing section 110 at a first joint 120, and the outer ring 114 can be coupled to the aft casing section 112 at a second joint 122. The structural casing 118 can define a fluid inlet 124, such as at a forward end of the forward casing section 110, and can define a fluid outlet 126, such as at an aft end of the aft casing section 112.

The forward casing section 110 can include a first radial flange 130 that extends radially outward at an aft end of the forward casing section 110. The outer ring 114 can include a second radial flange 132 that extends radially outward at a forward end of the outer ring 114, and can include a third radial flange 134 that extends radially outward at an aft end of the outer ring 114. The aft casing section 112 can include a fourth radial flange 136 that extends radially outward at a forward end of the aft casing section 112. The first radial flange 130 and the second radial flange 132 can abut each other and can be coupled together to couple the forward casing section 110 with the outer ring 114 and define the first joint 120. For example, a fastener 140 (e.g., a bolt, a bolt and nut, a rivet, etc.) can extend into or through both of the first radial flange 130 and the second radial flange 132. The third radial flange 134 and the fourth radial flange 136 can abut each other and can be coupled together to couple the outer ring 114 with the aft casing section 112 and define the second joint 122. For example, a fastener 142 (e.g., a bolt, a bolt and nut, a rivet, etc.) can extend into or through both of the third flange 134 and the fourth flange 136. The first, second, third, and fourth radial flanges 130, 132, 134, 136 can, for example, be perpendicular to the engine centerline 20.

The forward casing section 110 includes an inner radial surface 150. The outer ring 114 includes an inner radial surface 152. The aft casing section includes an inner radial surface 154. The inner containment ring 116 can be provided at (e.g., in contact with) the inner radial surface 152 or at the inner radial surface 150 and the inner radial surface 152. For example, the inner containment ring 116 can overlap in a radial direction relative to the engine centerline 20 with the outer ring 114 or overlap with the outer ring 114 and the forward casing section 110. The inner containment ring 116 includes a leading edge 160 and a trailing edge 162 aft of the leading edge 160. The inner containment ring 116 includes an axial length 116L measured parallel to the engine centerline 20 from the leading edge 160 to the trailing edge 162. The leading edge 160 can be disposed at various axial positions relative to an axial position of the first joint 120. An axial offset, measured parallel to the engine centerline 20, between the leading edge 160 and the axial position of the first joint 120 can, for example, be less than or equal to one half (50%), less than or equal to 75%, or less than or equal to 90% of the axial length 116L of the inner containment ring 116, which can include the axial offset being zero. Such a configuration can enable a more compact engine, a shorter engine, or both. The axial length 116L can correspond to an axial length 104L (e.g., an average axial blade length) of the set of blades 104. For example, the axial length 116L can be at least as long as the axial length 104L, less than or equal to 200% of the axial length 104L, or at least 50% of the axial length 104L. An axial length 114L of the outer ring 114 can be longer than the axial length 104L, the axial length 116L, or both.

In some examples, such as illustrated in FIG. 2, the axial offset is zero with the axial position of the leading edge 160 aligned with the axial position of the first joint 120. In such configurations, the inner containment ring 116 is fully axially aligned with the outer ring 114, which can include the trailing edge 162 not being aft of the outer ring 114, and the inner containment ring 116 overlapping with the outer ring 114 in the radial direction and not overlapping with the forward casing section 110 or the aft casing section 112 in the radial direction.

Figure 3:
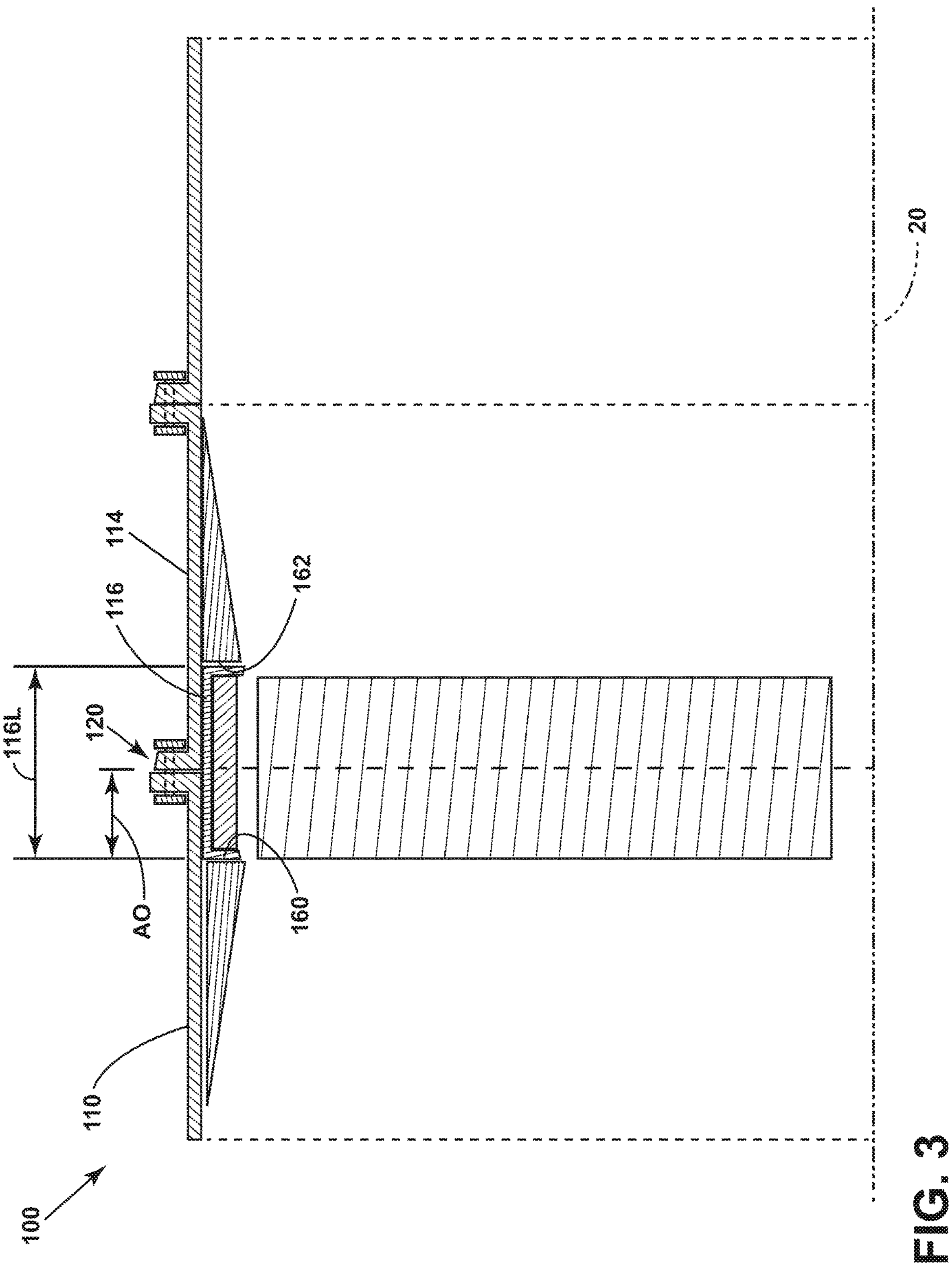
FIG. 3 is a cross-sectional view of a casing assembly in accordance with various aspects described herein.

In other examples of the casing assembly 100, such as illustrated in FIG. 3, the axial offset, illustrated by line AO, is greater than zero and the leading edge 160 is forward of the first joint 120 by up to half, 75%, or 90% of the axial length 116L (e.g., a portion of the inner containment ring 116 is farther forward than the outer ring 114). With such configurations, up to half, up to 25%, or up to 10% of the inner containment ring 116 overlaps in the radial direction with the forward casing section 110 and a remainder of the inner containment ring 116 overlaps in the radial direction, relative to the engine centerline 20, with the outer ring 114 such that the axial position of the first joint 120 is between the axial positions of the leading edge 160 and the trailing edge 162 (e.g., the inner containment ring 116 covers an inner radial side of the first joint 120). Such an overlapping configuration can allow for a shorter axial length of the casing assembly 100, relative to the engine centerline 20, such as with configurations in which the first radial flange 130 is positioned to accommodate one or more additional features of the forward casing section 110, such as, for example, a trunnion hole for a variable vane structure assembly.

Figure 4:
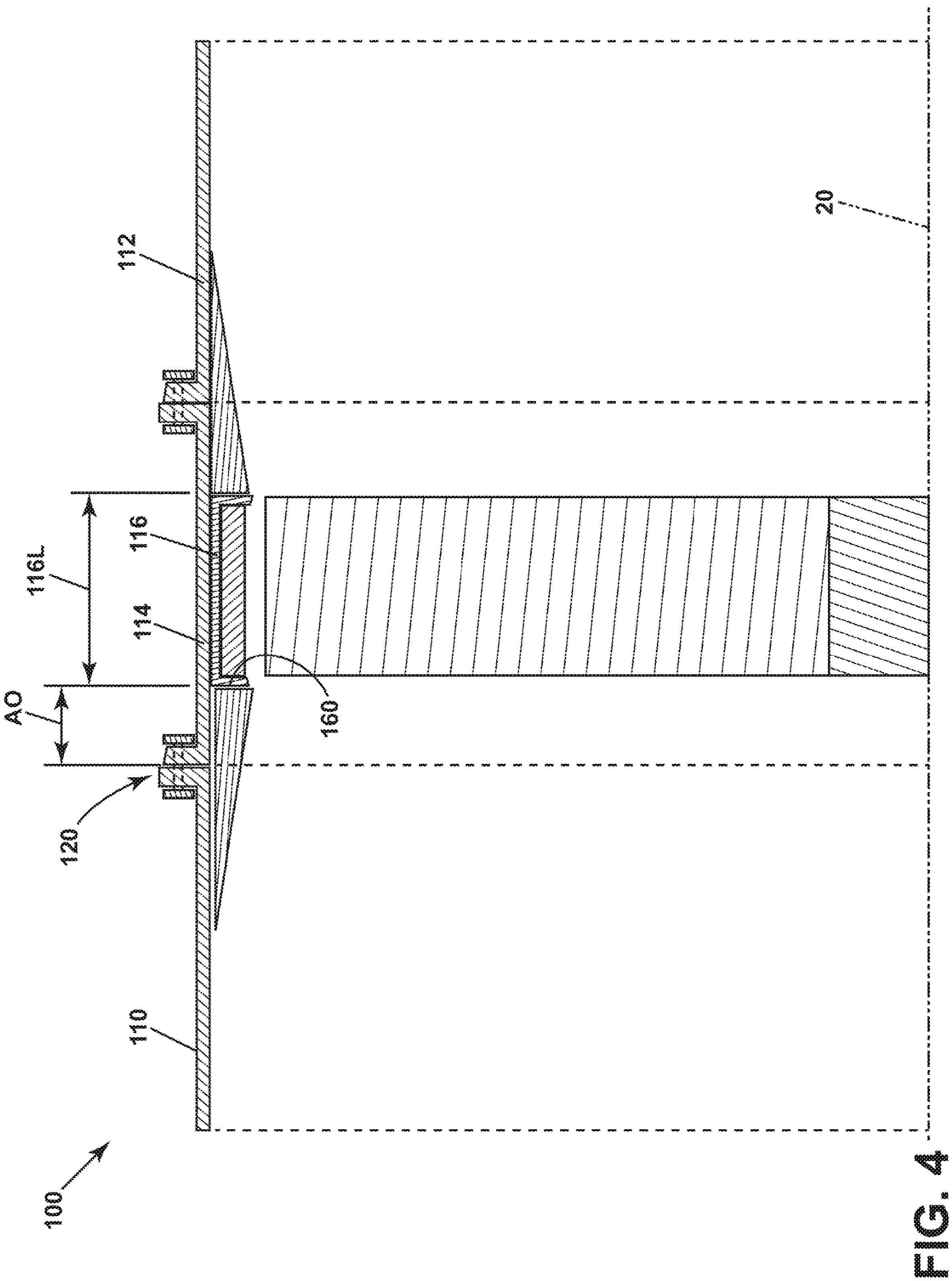
FIG. 4 is a cross-sectional view of a casing assembly in accordance with various aspects described herein.

In some other examples of the casing assembly 100, such as generally illustrated in FIG. 4, the axial offset, illustrated by line AO, is greater than zero and the leading edge 160 is aft of the first joint 120 by up to half of the axial length 116L. With such a configuration, the inner containment ring 116 is, like the example in FIG. 2, fully axially aligned with the outer ring 114 such that the inner containment ring 116 does not overlap in the radial direction, relative to the engine centerline 20, with the forward casing section 110 or the aft casing section 112.

Referring again to FIG. 2, the inner containment ring 116 can be coupled with the outer ring 114. For example, the inner containment ring 116 can be fastened to the outer ring 114 by a fastener 170 (e.g., a bolt, a bolt and nut, a rivet, etc.), can be bonded to the outer ring 114, can be pre-molded and co-cured with the outer ring 114, can be coupled with the outer ring 114 by other methods, or combinations thereof. The outer ring 114, the inner containment ring 116, or both, can be provided as a plurality of circumferential segments. For example, the inner containment ring 116 can include a plurality of circumferential segments coupled together, coupled to the outer ring 114, or both. In some examples, the inner containment ring 116 is in contact with and directly coupled to the outer ring 114 (e.g., an outer radial surface of the inner containment ring 116 is in contact with the inner radial surface 152).

The structural casing 118 can provide a load path for the casing assembly 100. The inner containment ring 116 can be coupled to the structural casing 118 (e.g., to the outer ring 114) such that the inner containment ring 116 is not in the load path, does not carry axial structural loads with the structural casing 118, or both. Such a configuration can, for example, allow for the inner containment ring 116 to be formed of materials that are more effective for blade fragment containment and energy absorption, such as compared to materials utilized for carrying multi-axial structural loads.

In some examples, the outer ring 114 comprises a first material and the inner containment ring 116 comprises a second material that is different from the first material. The second material can comprise a composite material. The outer ring 114, the first material, or both, can be devoid of composite materials. The outer ring 114 can, in some examples, comprise a different material composition than the forward casing section 110 and the aft casing section 112, which can facilitate separate formation of the outer ring 114 from and subsequent assembly with the forward casing section 110 and the aft casing section 112. For example, and without limitation, the forward casing section 110 and the aft casing section 112 can comprise one or more metallic materials, one or more composite materials, or combinations thereof, and the outer ring 114 can include at least one different metallic material, at least one different composite material, or combinations thereof, than the forward casing section 110 and the aft casing section 112. The different metallic material or composite material of the outer ring 114 can be in addition to or instead of the one or more materials of the forward casing section 110 and the aft casing section 112. In some examples, the forward casing section 110 and the aft casing section 112 include different material compositions from each other, from the outer ring 114, or both.

With some examples, the inner containment ring 116 includes a forward radial flange 180, an aft radial flange 182, or both. The forward radial flange 180 can extend radially inward and be disposed at or at least partially define the leading edge 160. The aft radial flange 182 can extend radially inward and can be disposed at or at least partially define the trailing edge 162. The forward and aft radial flanges 180, 182 can, for example, be perpendicular to the engine centerline 20. The forward radial flange 180, the aft radial flange 182, or both, can be provided to at least partially contain fragments of the set of blades 104 in the event of a blade out. In some examples, the forward radial flange 180, the aft radial flange 182, or both, are metallic, such as to facilitate containment of fragments. With some examples, the inner containment ring 116 is devoid of radial flanges (e.g., forward and aft radial flanges 180, 182).

The casing assembly 100 can include a material 190 (e.g., an abradable material) that can be disposed at an inner surface of the inner containment ring 116. In some examples, the material 190 is disposed axially between the forward radial flange 180 and the aft radial flange 182. The material 190 can be configured to break away, deform, absorb energy from fragments, or combinations thereof, such as in the event of a blade out of the set of blades 104. The material 190 can include, for example, one or more PMC materials, CMC materials, abradable seal materials (e.g., epoxy based, silicon based, etc.), other materials, or combinations thereof.

In some examples, a filler material 192 can be provided at the inner radial surface 150, at the inner radial surface 152, at the inner radial surface 154, or a combination thereof. The filler material 192 can facilitate fluid flow from the fluid inlet 124 toward the fluid outlet 126 (e.g., to limit flow obstruction by the inner containment ring 116, such as by the forward radial flange 180, the aft radial flange 182, or both). For example, the filler material 192 can have a ramped configuration at one or both of the leading edge 160 or the trailing edge 162 of the inner containment ring 116.

While described with respect to a turbine engine, it should be appreciated that application of aspects of the disclosure discussed herein are applicable to engines with propeller sections or fan and booster sections along with turbojets and turbo engines as well.

To the extent not already described, the different features and structures of the various embodiments can be used in combination, or in substitution with each other as desired. That one feature is not illustrated in all of the embodiments is not meant to be construed that it cannot be so illustrated but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A gas turbine engine, comprising: a fan section, compressor section, combustor section, and turbine section in serial flow arrangement, at least one of the fan section, the compressor section, or the turbine section comprising: a rotor comprising a plurality of blades and rotatable about a rotational axis; and a casing assembly disposed at least partially around the rotor, the casing assembly comprising: a forward casing section; an aft casing section; an outer ring coupled to the forward casing section and the aft casing section, the outer ring coupled to the forward casing section at a joint; and an inner containment ring radially inward of the outer ring, and at least partially axially aligned with the plurality of blades; wherein an axial offset between the joint and a leading edge of the inner containment ring is less than or equal to half of an axial length of the inner containment ring.

The gas turbine engine of any preceding clause, wherein the inner containment ring is axially aligned with the outer ring.

The gas turbine engine of any preceding clause, wherein the inner containment ring is fully axially aligned with the outer ring.

The gas turbine engine of any preceding clause, wherein the inner containment ring overlaps with the forward casing section and the outer ring.

The gas turbine engine of any preceding clause, wherein the forward casing section, the aft casing section, and the outer ring form a structural casing.

The gas turbine engine of any preceding clause, wherein the inner containment ring is bonded to the outer ring.

The gas turbine engine of any preceding clause, wherein the outer ring comprises a first material and the inner containment ring comprises a second material different from the first material.

The gas turbine engine of any preceding clause, wherein the second material is a composite material.

The gas turbine engine of any preceding clause, wherein the first material is devoid of composite materials.

The gas turbine engine of any preceding clause, wherein the forward casing section comprises a first radial flange; the outer ring includes a second radial flange and a third radial flange, the second radial flange coupled to the first radial flange; and the aft casing section includes fourth radial flange coupled to the third radial flange.

The gas turbine engine of any preceding clause, wherein the first radial flange and the second radial flange are bolted together.

The gas turbine engine of any preceding clause, wherein the axial length of the inner containment ring corresponds to a blade length of a blade of the gas turbine engine.

The gas turbine engine of any preceding clause, wherein the inner containment ring comprises a plurality of circumferential segments.

The gas turbine engine of any preceding clause, wherein the inner containment ring includes a forward radial flange and an aft radial flange that extend radially inward.

The gas turbine engine of any preceding clause, further comprising an abradable material disposed axially between the forward radial flange and the aft radial flange.

The gas turbine engine of any preceding clause, wherein the forward radial flange and the aft radial flange are metallic.

The gas turbine engine of any preceding clause, wherein the axial offset is greater than zero and the leading edge is forward or aft of the joint.

The gas turbine engine of any preceding clause, wherein the axial offset is zero and the lead edge is aligned with the joint.

The gas turbine engine of any preceding clause, wherein the inner containment ring is in contact with and coupled directly to the outer ring.

The gas turbine engine of any preceding clause, wherein an axial length of the outer ring is greater than the axial length of the inner containment ring.

The gas turbine engine of any preceding clause, wherein the outer ring includes a different material composition than the forward casing section and the aft casing section.

A gas turbine engine, comprising: a fan section, compressor section, combustor section, and turbine section in serial flow arrangement, with one of the fan section, compressor section, and turbine section having a plurality of circumferentially-spaced blades; a casing defining an inner surface circumscribing at least a portion of the fan section and having a forward section and an aft section joined at a joint; and a containment ring adjacent the inner surface and confronting the plurality of blades, the containment ring having a leading edge and an axial length, wherein an axial offset between the joint and the leading edge is less than or equal to half of an axial length of the containment ring.

A gas turbine engine, comprising: a fan section, compressor section, combustor section, and turbine section in serial flow arrangement, at least one of the fan section, the compressor section, or the turbine section comprising: a rotor comprising a plurality of blades and rotatable about a rotational axis; and a casing assembly disposed at least partially around the rotor, the casing assembly comprising: a forward casing section; an aft casing section; an outer ring coupled to the forward casing section and the aft casing section, the outer ring coupled to the forward casing section at a joint; and an inner containment ring radially inward of the outer ring, and at least partially axially aligned with the plurality of blades; wherein the joint is disposed at a first axial position; wherein a leading edge of the containment ring is disposed at a second axial position; and wherein an axial offset between the first axial position and the second axial position is less than or equal to half of an axial length of the inner containment ring.

The gas turbine engine of any preceding clause, wherein a portion of the inner containment ring is farther forward than the outer ring.

The gas turbine engine of any preceding clause, wherein the axial offset is greater than zero and the leading edge is forward of the joint.

The gas turbine engine of any preceding clause, wherein the axial offset is greater than zero and the leading edge is aft of the joint.

An aircraft comprising the gas turbine engine of any preceding clause.

What is claimed is:

1. A gas turbine engine, comprising:

a fan section, compressor section, combustor section, and turbine section in serial flow arrangement, at least one of the fan section, the compressor section, or the turbine section comprising:

a rotor comprising a plurality of blades and rotatable about a rotational axis; and a casing assembly disposed at least partially around the rotor, the casing assembly comprising:

a forward casing section;

an aft casing section;

an outer ring coupled to the forward casing section and the aft casing section, the outer ring coupled to the forward casing section at a joint; and an inner containment ring radially inward of the outer ring, and at least partially axially aligned with the plurality of blades;

wherein an axial offset between the joint and a leading edge of the inner containment ring is less than or equal to half of an axial length of the inner containment ring.

2. The gas turbine engine of claim 1, wherein the inner containment ring is axially aligned with the outer ring.

3. The gas turbine engine of claim 1, wherein the inner containment ring overlaps with the forward casing section and the outer ring.

4. The gas turbine engine of claim 1, wherein the forward casing section, the aft casing section, and the outer ring form a structural casing.

5. The gas turbine engine of claim 1, wherein the outer ring comprises a first material and the inner containment ring comprises a second material different from the first material.

6. The gas turbine engine of claim 5, wherein the second material is a composite material.

7. The gas turbine engine of claim 6, wherein the first material is devoid of composite materials.

8. The gas turbine engine of claim 1, wherein the forward casing section comprises a first radial flange;

the outer ring includes a second radial flange and a third radial flange, the second radial flange coupled to the first radial flange; and the aft casing section includes fourth radial flange coupled to the third radial flange.

9. The gas turbine engine of claim 1, wherein the axial length of the inner containment ring corresponds to a blade length of a blade of the gas turbine engine.

10. The gas turbine engine of claim 1, wherein the inner containment ring comprises a plurality of circumferential segments.

11. The gas turbine engine of claim 1, wherein the inner containment ring includes a forward radial flange and an aft radial flange that extend radially inward.

12. The gas turbine engine of claim 11, further comprising an abradable material disposed axially between the forward radial flange and the aft radial flange.

13. The gas turbine engine of claim 12, wherein the forward radial flange and the aft radial flange are metallic.

14. The gas turbine engine of claim 1, wherein the axial offset is greater than zero and the leading edge is forward or aft of the joint.

15. The gas turbine engine of claim 1, wherein the axial offset is zero and the leading edge is aligned with the joint.

16. The gas turbine engine of claim 1, wherein the inner containment ring is in contact with and coupled directly to the outer ring.

17. The gas turbine engine of claim 1, wherein an axial length of the outer ring is greater than the axial length of the inner containment ring.

18. A gas turbine engine, comprising:

a fan section, compressor section, combustor section, and turbine section in serial flow arrangement, at least one of the fan section, the compressor section, or the turbine section comprising:

a rotor comprising a plurality of blades and rotatable about a rotational axis; and a casing assembly disposed at least partially around the rotor, the casing assembly comprising:

a forward casing section;

an aft casing section;

an outer ring coupled to the forward casing section and the aft casing section, the outer ring coupled to the forward casing section at a joint; and an inner containment ring radially inward of the outer ring, and at least partially axially aligned with the plurality of blades, the inner containment ring extending axially between a leading edge and a trailing edge;

wherein the leading edge is axially forward of the joint, with respect to the rotational axis.

19. A gas turbine engine, comprising:

a fan section, compressor section, combustor section, and turbine section in serial flow arrangement, at least one of the fan section, the compressor section, or the turbine section comprising:

a rotor comprising a plurality of blades and rotatable about a rotational axis; and a casing assembly disposed at least partially around the rotor, the casing assembly comprising:

a forward casing section;

an aft casing section;

an outer ring coupled to the forward casing section and the aft casing section, the outer ring coupled to the forward casing section at a joint; and an inner containment ring radially inward of the outer ring, and at least partially axially aligned with the plurality of blades;

wherein the outer ring includes a first composite material, and the inner containment ring includes a second composite material that is co-cured or pre-molded with the first composite material.

20. The gas turbine engine of claim 19, wherein the first composite material is different from the second composite material.

* * * * *